US009666235B2

(12) United States Patent
Jabbari et al.

(10) Patent No.: US 9,666,235 B2
(45) Date of Patent: May 30, 2017

(54) PARTICULATE FILTER

(71) Applicant: Seagate Technology LLC, Cupertino, CA (US)

(72) Inventors: Iraj Jabbari, La Jolla, CA (US); Robert A. Alt, Niwot, CO (US); Jeffrey L. Bruce, Longmont, CO (US); Jeffrey James Croxall, Boulder, CO (US)

(73) Assignee: Seagate Technology LLC, Cupertino, CA (US)

( * ) Notice: Subject to any disclaimer, the term of this patent is extended or adjusted under 35 U.S.C. 154(b) by 0 days.

(21) Appl. No.: 14/881,942

(22) Filed: Oct. 13, 2015

(65) Prior Publication Data

US 2017/0103785 A1   Apr. 13, 2017

(51) Int. Cl.
*G11B 33/14* (2006.01)
*B01D 46/00* (2006.01)
*B01D 46/10* (2006.01)

(52) U.S. Cl.
CPC ........ *G11B 33/146* (2013.01); *B01D 46/0005* (2013.01); *B01D 46/0041* (2013.01); *B01D 46/10* (2013.01); *B01D 2265/04* (2013.01); *B01D 2273/10* (2013.01); *B01D 2273/30* (2013.01)

(58) Field of Classification Search
None
See application file for complete search history.

(56) References Cited

U.S. PATENT DOCUMENTS

| 4,282,554 A | * | 8/1981 | Ho .................................. 360/97 |
| 4,594,626 A | | 6/1986 | Frangesh |
| 4,821,130 A | | 4/1989 | Bernett et al. |
| 5,012,365 A | * | 4/1991 | Yokoyama ................. 360/97.03 |
| 5,134,530 A | | 7/1992 | Hall |
| 5,140,578 A | * | 8/1992 | Tohkairin ..................... 369/75.2 |
| 5,212,679 A | * | 5/1993 | Tohkairin ..................... 369/75.2 |
| 5,696,649 A | | 12/1997 | Boutaghou |
| 6,208,484 B1 | | 3/2001 | Voights |
| 6,266,208 B1 | | 7/2001 | Voights |
| 6,337,782 B1 | | 1/2002 | Guerin et al. |
| 6,342,991 B1 | | 1/2002 | Joshi et al. |
| 6,369,977 B1 | * | 4/2002 | Imai .......................... 360/97.02 |

(Continued)

FOREIGN PATENT DOCUMENTS

| GB | 1409099 A | * 10/1975 | .......... G11B 5/6005 |
| JP | 60052991 A | * 3/1985 | |

(Continued)

*Primary Examiner* — Will J Klimowicz
(74) *Attorney, Agent, or Firm* — Crawford Maunu PLLC

(57) ABSTRACT

Certain exemplary aspects of the present disclosure are directed towards an apparatus including a base deck forming a sealed cavity. A filter coupled to a surface of the base deck within the cavity filters particulate from a flow of gas in the cavity. The recirculation filter including a protrusion extending over a surface of a storage medium within the cavity that diverts gas from a surface of the storage medium toward the filter. A bypass channel, defined by a portion of the cavity and a portion of the filter, in conjunction with the protrusion forms a pressure differential that draws a first portion of the diverted gas through the filter by bypassing the filter with a second portion of the diverted gas.

18 Claims, 3 Drawing Sheets

(56) References Cited

U.S. PATENT DOCUMENTS

| | | |
|---|---|---|
| 6,542,328 B2 | 4/2003 | Harrison et al. |
| 6,545,842 B2 | 4/2003 | Rao et al. |
| 6,549,365 B1 | 4/2003 | Severson |
| 6,594,108 B2 | 7/2003 | Naganathan et al. |
| 6,710,977 B2 | 3/2004 | Tadepalli et al. |
| 6,804,087 B2 | 10/2004 | Wobbe et al. |
| 6,937,433 B2 | 8/2005 | Dahlenburg et al. |
| 6,995,947 B2 | 2/2006 | Korkowski et al. |
| 7,023,655 B2 * | 4/2006 | Smith .................. 360/97.02 |
| 7,057,851 B2 | 6/2006 | Sun et al. |
| 7,092,202 B1 | 8/2006 | Orr, Jr. et al. |
| 7,123,439 B2 | 10/2006 | Chan et al. |
| 7,158,342 B2 | 1/2007 | Chan et al. |
| 7,203,030 B2 | 4/2007 | Chan et al. |
| 7,379,265 B2 | 5/2008 | Wang et al. |
| 7,405,902 B2 | 7/2008 | Sorrell et al. |
| 7,405,904 B2 | 7/2008 | Chan et al. |
| 7,450,338 B2 | 11/2008 | Hur |
| 7,508,623 B2 | 3/2009 | Gross |
| 7,573,672 B2 | 8/2009 | Han et al. |
| 7,573,673 B2 | 8/2009 | Lai et al. |
| 7,616,402 B2 | 11/2009 | Suwa et al. |
| 7,787,213 B1 | 8/2010 | Michael et al. |
| 7,830,636 B2 | 11/2010 | Ang et al. |
| 7,869,159 B2 | 1/2011 | Abe et al. |
| 7,898,764 B2 | 3/2011 | Chan et al. |
| 7,929,246 B2 | 4/2011 | Takemori et al. |
| 8,004,790 B2 | 8/2011 | Chan et al. |
| 8,031,430 B2 | 10/2011 | Chan et al. |
| 8,077,431 B2 | 12/2011 | Abe et al. |
| 8,102,621 B2 * | 1/2012 | Hendriks .................. 360/97.02 |
| 8,194,345 B2 | 6/2012 | Kwon et al. |
| 8,345,377 B2 | 1/2013 | Hendriks |
| 8,355,220 B2 | 1/2013 | Chan et al. |
| 8,369,043 B2 * | 2/2013 | Kong .................. 360/97.17 |
| 8,638,524 B2 * | 1/2014 | Brown .................. 360/97.17 |
| 8,638,525 B1 * | 1/2014 | Sugii .................. 360/97.17 |
| 2002/0036862 A1 | 3/2002 | Tsang et al. |
| 2002/0075590 A1 * | 6/2002 | Garikipati .................. 360/97.02 |
| 2003/0156352 A1 * | 8/2003 | Voights .................. 360/97.02 |
| 2005/0041329 A1 | 2/2005 | Chan et al. |
| 2005/0041332 A1 | 2/2005 | Chan et al. |
| 2005/0063092 A1 | 3/2005 | Xu et al. |
| 2005/0157430 A1 | 7/2005 | Korkowski et al. |
| 2005/0185324 A1 | 8/2005 | Suwa et al. |
| 2005/0185325 A1 | 8/2005 | Hur |
| 2006/0061905 A1 | 3/2006 | Lai et al. |
| 2006/0203390 A1 | 9/2006 | Fong et al. |
| 2008/0013206 A1 * | 1/2008 | Feliss .................. 360/97.02 |
| 2009/0002882 A1 * | 1/2009 | Yoshikawa .................. 360/97.02 |
| 2009/0073606 A1 | 3/2009 | Sun et al. |
| 2010/0134920 A1 | 6/2010 | Nizumoto et al. |
| 2010/0246059 A1 * | 9/2010 | Shimizu .................. 360/97.02 |
| 2013/0088795 A1 * | 4/2013 | Brown .................. 360/97.14 |

FOREIGN PATENT DOCUMENTS

| | | | | |
|---|---|---|---|---|
| JP | 61198485 A | * | 9/1986 | |
| JP | 62188088 A | * | 8/1987 | |
| JP | 62298076 A | * | 12/1987 | |
| JP | 01307986 A | * | 12/1989 | |
| JP | 02061885 A | * | 3/1990 | |
| JP | GB 2225895 A | * | 6/1990 | ......... G11B 33/1446 |
| JP | 03216887 A | * | 9/1991 | |
| JP | 04186589 A | * | 7/1992 | |
| JP | 04358389 A | * | 12/1992 | |
| JP | 05062451 A | * | 3/1993 | |
| JP | 2009015882 A | * | 1/2009 | |
| JP | 2009301642 A | * | 12/2009 | |
| JP | 2010238311 A | * | 10/2010 | |
| JP | 2013084340 A | * | 5/2013 | |
| WO | WO 0213945 A2 | * | 2/2002 | ......... B01D 46/0036 |
| WO | WO 03092010 A1 | * | 11/2003 | ............ G11B 33/14 |
| WO | WO 2004102575 A1 | * | 11/2004 | ......... G11B 33/1446 |

* cited by examiner

FIG. 2A  FIG. 2B

PARTICULATE FILTER

SUMMARY

Various example embodiments are directed to apparatuses and methods involving particular filtering within an atmosphere of a cavity. Such embodiments may be implemented to minimize atmospheric clean-up times and capture a majority of particles as small as 100 nanometers (or smaller) in sealed cavities, and can be carried out in low-density atmospheres (e.g., densities lower than air). Certain embodiments achieve desirable atmospheric particulate removal by using structural components to divert gas into a filter. Various embodiments utilize a bypass channel that flows some of the gas past the filter, which increases an amount of gas that is drawn through the filter.

In various embodiments, protrusion(s) (also referred to herein as a shroud(s)) extend into a cavity and divert a portion of gas flowing therein. The protrusion diverts air toward the filter, which can create a high pressure at an inlet of the filter relative to pressure at an outlet of the filter. One or more of these embodiments may be particularly applicable, for example, to sealed disc drive cavities in which such a protrusion or protrusions may extend along a surface of a disc and/or between discs in the cavity. Such a cavity may, for example, be hermetically sealed with a low-density gas such as helium therein, in which a data storage medium (disc) rotates. The protrusion helps to divert the low-density gas toward the filter, which can help address challenges relating to the movement of the gas. In this context, aspects of the present disclosure compensate for fluid flow characteristics of low-density atmospheres (e.g., relative to air) and increase the flow of low-density gas through the filter, enhancing particulate capture and overall atmospheric clean-up times of the cavity.

Various example embodiments are directed to a base deck with a cavity, the cavity designed to house data storage components including a storage medium (e.g., as may be implemented with a hard disc drive). The data storage components include a storage medium and related data access componentry that provide access to data stored on the storage medium as the storage medium rotates. The components may, for example, include a transducer and related supporting structure and control circuitry that move the transducer to respective data storage locations on a hard disc for reading and/or writing data. The apparatus further includes a filter positioned within the cavity, laterally adjacent the storage medium. A protrusion extends over a surface of the storage medium within the cavity and diverts gas, rotating around the cavity in response to a rotation of the storage medium, from a surface of the storage medium toward the filter. A first portion of the gas is directed through the filter where particulate suspended in the gas is captured. A second portion of the gas is directed through a bypass channel defined by a sidewall of the cavity and a portion of the filter. The bypass channel and the protrusion create a pressure differential that draws the first portion of the diverted gas through the filter. In more specific embodiments, the filter includes a filter bracket coupled to the base deck at a portion of the base deck laterally adjacent the storage medium. A filter material is secured to the filter bracket, and a portion of the filter bracket and the sidewall of the cavity define a width of the bypass channel.

In other embodiments, a disc drive apparatus includes a base deck having a cavity, data storage components in the cavity, and a cover hermetically sealing the cavity. The data storage components include a plurality of storage mediums in a stacked arrangement. Access is provided to data stored on the storage mediums as the storage mediums rotate within the cavity. The cavity is filled with a low-density atmosphere, such as by filling the cavity with a low-density gas (e.g., helium) at sub-ambient pressure (e.g., gas having a density less than about 0.5 atm at sea level). A recirculation filter is coupled to the base deck within the cavity, and includes a frame, a plurality of protrusions, and a filter membrane. The frame extends between an inner sidewall of the base deck and the storage mediums, and is offset from the inner sidewall to form a channel (also referred to as a bypass channel) between the frame and the inner sidewall. Each of the protrusions extends from the frame to a position between adjacent ones of the storage mediums. The filter membrane captures particulates from the gas as it flows through the filter membrane. In further embodiments, the frame and the protrusions generate a pressure differential across the filter membrane by drawing a portion of the gas around the filter membrane via the channel, which facilitates flow of another portion of the gas through the filter.

The above discussion/summary is not intended to describe each embodiment or every implementation of the present disclosure. The figures and detailed description that follow also exemplify various embodiments.

BRIEF DESCRIPTION OF FIGURES

Various example embodiments may be more completely understood in consideration of the following detailed description in connection with the accompanying drawings, in which:

FIG. 2A is an isometric view of a recirculation filter housing, consistent with various aspects of the present disclosure;

FIG. 2B is an isometric view of a recirculation filter housing, consistent with various aspects of the present disclosure;

Figure 1A:
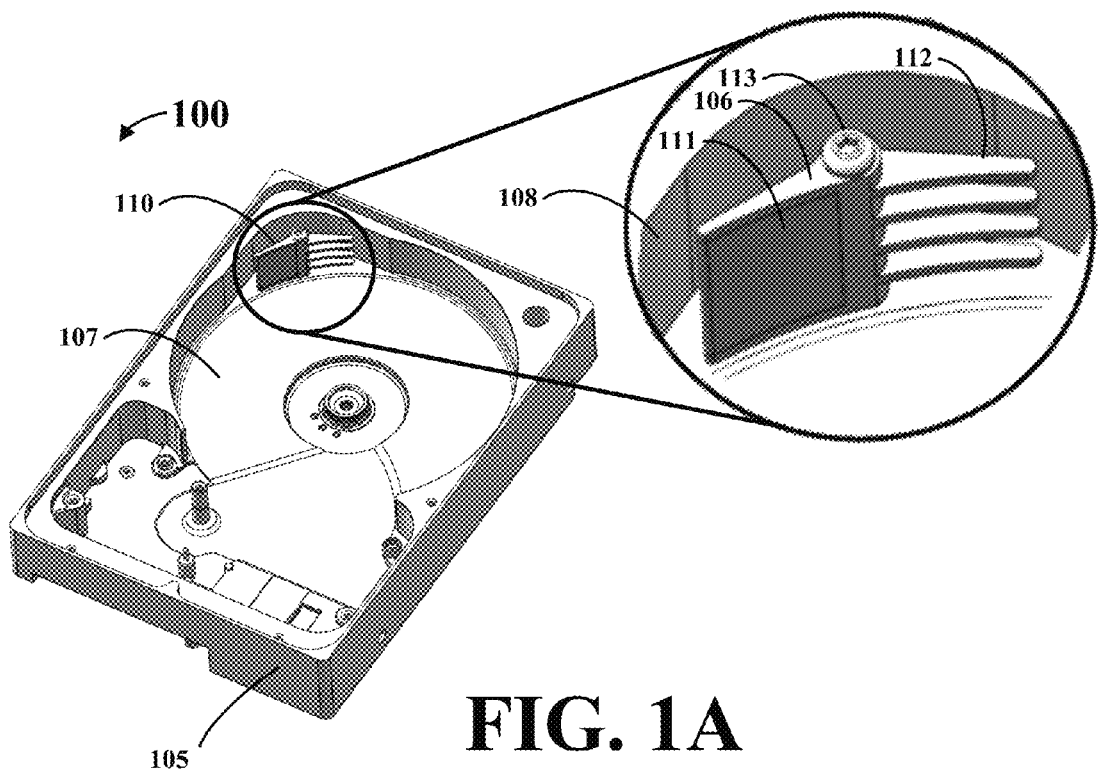
FIG. 1A is an isometric view of a partially assembled disc drive apparatus, consistent with various aspects of the present disclosure.

While various embodiments discussed herein are amenable to modifications and alternative forms, aspects thereof have been shown by way of example in the drawings and will be described in detail. It should be understood, however, that the intention is not to limit the invention to the particular embodiments described. On the contrary, the intention is to cover all modifications, equivalents, and alternatives falling within the scope of the disclosure including aspects defined in the claims. In addition, the term "example" as used throughout this application is only by way of illustration, and not limitation.

DETAILED DESCRIPTION

Aspects of the present invention are believed to be applicable to a variety of different types of devices, systems and arrangements involving filtering an atmosphere within a sealed cavity. Specific embodiments are believed to be particularly beneficial to sealed disc drives, such as those containing low density gases. While the present invention is not necessarily so limited, various aspects of the invention may be appreciated through a discussion of examples using this context.

Various example embodiments are directed to apparatuses and methods that facilitate the purification of an atmosphere within a sealed cavity by removing suspended particulates. Gas from the atmosphere is diverted through a filter that removes the particulate. Diversion techniques may include utilizing structural characteristics of and/or within a cavity to divert a first portion of gas through a particulate filter, by flowing a second portion of gas through a bypass channel that circumvents the filter. Embodiments of the present disclosure exhibit enhanced flow through the particulate filter, which may be implemented with low-density gas that may otherwise be challenging to filter.

In some implementations, protrusions are positioned in the cavity and used to divert a portion of rotating gas toward an inlet of the particular filter, creating a high pressure at the inlet with a relatively lower pressure near an outlet of the particulate filter. Such flow diversion is useful for applications utilizing low-density atmosphere that exhibits decreased friction-induced flow characteristics (e.g., relative to air). In this context, aspects of the present disclosure compensate for undesirable fluid flow characteristics of low-density atmospheres, and address challenges relating to reduced particulate capture rates, and time required to filter a desired number of particulates within the cavity.

Various aspects of the present disclosure address problems related to sealed disc drive cavities including an atmosphere consisting at least partially of low-density gas (e.g., helium gas, or a gas/gas combination with a pressure of less than 0.5 atm at sea level). Disc drives with low-density atmospheres have an increased likelihood of failure associated with particulate deposit on critical/sensitive electro-mechanical components. It has been discovered that the flow of low-density gas through filters in such applications can be relatively limited, due at least in part to the gas within the cavity being of a lower density. Various aspects address such challenges, mitigating issues relating to relatively slow filtering and related accumulation of particulate on components of the disc drive.

Aspects of the present disclosure mitigate the risk of damage to disc drive components operating in a low-density atmosphere, by implementing a bypass channel with a filter in which a portion of gas flowing in the low-density atmosphere bypasses the filter, facilitating an increased flow rate through the filter. One or more protrusions that extend over a surface of a rotating storage medium in the disc drive may also be used to direct the flow of gas toward the filter. These approaches may generally direct flowing gas into the filter and/or otherwise facilitate the flow of gas through the filter by creating a relative low pressure area adjacent an output of the filter, which draws gas through the filter. Various experimental embodiments have evidenced a flow of low-density gas such as helium through the filter greater than 30 cubic centimeters/second, a 50% improvement in particulate filter clean-up time, and capture rates of 100-500 nm particulate within the cavity of greater than 50%.

Various example embodiments are directed to apparatuses including a base deck having a cavity designed to house data storage components including a storage medium. The data storage components include one or more storage mediums, and provide access to data stored on the one or more storage mediums as the storage medium(s) rotates. A filter is positioned within the cavity, laterally adjacent the storage medium. A protrusion extends over a surface of the storage medium within the cavity and diverts gas, flowing in the cavity (due to rotation of the storage medium and related friction), from a surface of the storage medium toward the filter. A first portion of the diverted gas is directed through the filter where particulate suspended in the gas is captured, while the gas is allowed to pass through the filter. A second portion of the diverted gas is directed through a bypass channel, defined by a sidewall of the cavity and a portion of the filter. It has been discovered that the bypass channel and the protrusion create a pressure differential that draws the first portion of the diverted gas through the filter by bypassing the filter with the second portion of the diverted gas, increasing an overall flow of gas through the filter. In more specific embodiments, the filter includes a filter bracket coupled to the base deck at a portion of the base deck laterally adjacent the storage medium, with filter material secured to the filter bracket and with the filter bracket and sidewall defining a width of the bypass channel.

In various embodiments, a higher-pressure area is generated at an inlet of the filter and a lower-pressure area is generated at an outlet of the filter. The pressure differential pulls the gas at the inlet of the filter through the filter to the lower-pressure area at the outlet, facilitating filtering of particulate in the gas within the cavity. In more specific embodiments, the filter, the protrusion, and the rotating storage medium create a pressure differential across the filter that is greater than 15 pascals.

In further embodiments, the apparatus may include a transducer that accesses data stored on the one or more storage mediums as the storage medium(s) rotates. A voice coil motor, coupled to the base deck and the transducer, positions the transducer relative to the storage medium. In such embodiments, the voice coil motor and the transducer may be located in the cavity at a position on the opposite side of the storage medium, relative to the filter. It has been discovered that locating the filter opposite the transducer results in desirable flow through the filter, and addresses issues relating to decreased or variable gas velocity at a surface of the storage medium proximate the transducer (which may otherwise prevent the transducer from properly accessing data from the surface of the storage medium). In various implementations, the shape of the protrusion is designed to mitigate atmospheric flow variation at a surface of the storage medium proximate the transducer.

In accordance with aspects of the present disclosure, data storage components as characterized herein include storage mediums in a stacked arrangement, with surfaces of adjacent storage mediums facing each other and exhibiting a gap therebetween. In various instances, the gap is substantially free of structure, except for a protrusion as characterized herein, extending into the gap and being operable to direct gas flowing along the respective surfaces toward a filter. In various implementations, gas flow along a vector extending tangentially from the storage mediums is directed to the filter. In further embodiments, the protrusion absorbs vibration energy exerted on the storage medium by contacting the storage medium and transferring the vibration energy to the protrusion.

Aspects of the present disclosure also facilitate manufacture of an apparatus as characterized herein by rotationally coupling the protrusion to the base deck (e.g., via a shaft or other fastener). The protrusion rotates to a first position in which the protrusion is laterally adjacent the storage medium, allowing for assembly of the storage medium in the cavity. The protrusion also rotates to a second position in which the protrusion extends over the surface of the storage medium, after the storage medium has been installed.

In various embodiments of the present disclosure, a base deck includes a bottom portion and sidewalls extending upward from the bottom portion, which in part defines a cavity. The shape of the sidewalls provide a mounting space between the storage medium and an inner surface of the sidewall that faces the storage medium. The filter is coupled to the bottom portion of the base deck in the mounting space. In more specific embodiments, the storage medium has a circular shape and substantially all of the inner surface of the sidewall conforms to the circular shape, with the inner surface of the sidewall having a shape that diverts from the circular shape at the mounting space.

In specific experimental embodiments of the present disclosure utilizing a low-density helium atmosphere (less than about 0.5 atm at sea level) within a cavity as characterized herein, the following results have been evidenced with a storage medium rotating at 7200 rounds-per-minute within the cavity:
 a flow rate of gas through the filter greater than 30 cubic centimeters/second,
 a capture rate of greater than 60% for 100 nm particulates in the cavity, and
 a capture rate of greater than 70% for 500 nm particulates in the cavity.

Various embodiments of the apparatus include a tapered filter channel, which results in the acceleration of gas flow. This acceleration facilitates the capture of suspended particles in the atmosphere.

In other embodiments of the present disclosure, a disc drive apparatus includes a base deck having a cavity, data storage components in the cavity, and a cover hermetically sealing the cavity. The data storage components include storage mediums in a stacked arrangement, and provide access to data stored on the storage mediums as the storage mediums rotate within the cavity. A low-density atmosphere is sealed within the cavity, and includes a helium gas with a pressure less than about 0.5 atm at sea level. A recirculation filter is coupled to the base deck within the cavity and includes a frame, a plurality of protrusions, and a filter membrane. The frame extends between an inner sidewall of the base deck and the storage mediums, and is offset from the inner sidewall to form a channel (also referred to as a bypass channel) between the frame and the inner sidewall. Each of the protrusions extends from the frame to a position between adjacent ones of the storage mediums. The filter membrane coupled to the frame filters the gas by, in conjunction with the channel and the protrusions, capturing particulate as it flows through the filter membrane. In further embodiments, the frame and the protrusions generate a pressure differential across the filter membrane by drawing a portion of the gas around the filter membrane via the channel (also referred to as a bypass channel), therein causing another portion of the gas to flow through the filter and for particulate to be removed from the gas.

Turning now to the figures, FIG. 1A is an isometric view of a partially assembled disc drive apparatus 100, consistent with various aspects of the present disclosure. The partially assembled disc drive apparatus 100 includes a recirculation filter assembly 110 coupled within a cavity 107 of base deck 105 via a fastener 113. The recirculation filter assembly 110 includes a particulate filter 111 coupled to filter frame 106. The particulate filter 111 allows for the flow of an atmosphere through the filter while capturing particulate therein. Opposite the particulate filter 111, a plurality of shrouds, or protrusions, 112 extend horizontally relative to a bottom surface of cavity 107. FIG. 1A shows the recirculation filter assembly 110 in a retracted position during assembly of the disc drive. In the retracted position, the recirculation filter assembly 110 provides clearance for data storage mediums to be inserted into and installed within the cavity 107. Once the data storage mediums are installed, the shroud portion 112 of the recirculation filter assembly 110 is rotationally extended, relative to the fastener 113, further into the cavity 107. Each of the plurality of shrouds 112 extends into one of the spaces between peripheral ends of adjacent ones of the data storage mediums. Accordingly, the particulate filter 111 rotates into close proximity to a peripheral wall 108 of the cavity 107. The extended position of the recirculation filter assembly 110 is shown in FIG. 1B.

Figure 1B:
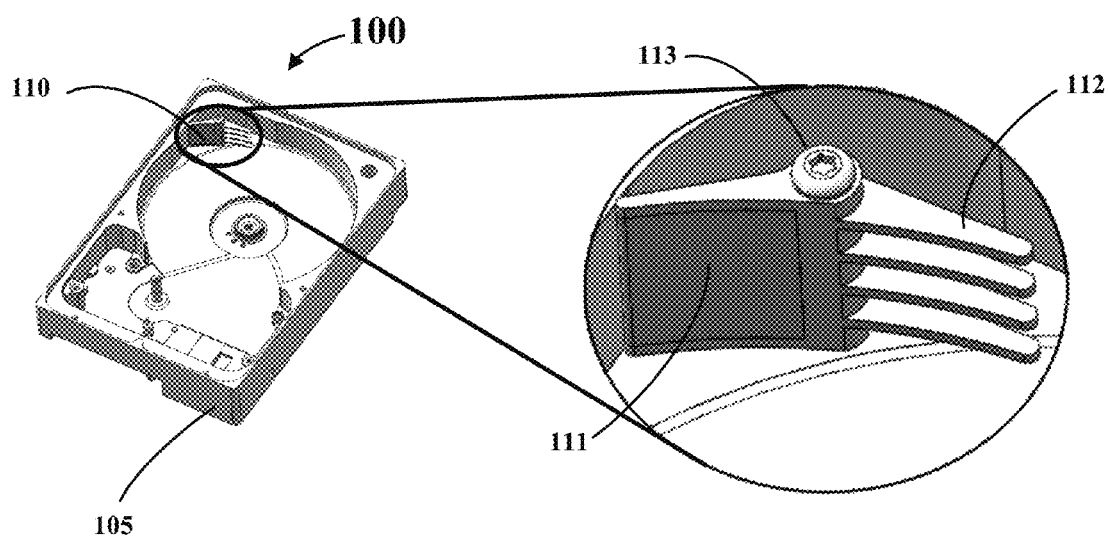
FIG. 1B is an isometric view of a partially assembled disc drive apparatus, consistent with various aspects of the present disclosure.

FIG. 1B is an isometric view of a partially assembled disc drive apparatus 100 shown in FIG. 1A. After data storage mediums have been assembled in the cavity 107 of the base deck 105, the recirculation filter assembly 110 may be rotated into the extended position as shown. In the extended position, the plurality of shrouds 112 extend between peripheral ends of adjacent ones of the data storage mediums. After pivoting the shrouds into the extended position, the fastener 113 may be (further) fastened to maintain the position of the recirculation filter assembly 110 during the life of the disc drive apparatus 100. During operation of the disc drive apparatus 100, the data storage mediums rotate at a high rate of speed causing a flow of atmosphere within the cavity 107. Where the cavity 107 contains a low-density atmosphere (e.g., helium), the flow of atmosphere through particulate filter 111 may be greatly diminished. The plurality of shrouds 112 extending between the rotating data storage mediums diverts additional atmosphere into the particulate filter 111 and also creates an advantageous pressure differential on either side of the particulate filter 111 that pulls the high-pressure atmosphere upwind from the particulate filter 111 through to a low-pressure area down-wind from the plurality of shrouds 112 to facilitate an improved atmospheric flow rate through the particulate filter 111.

Figure 2C:
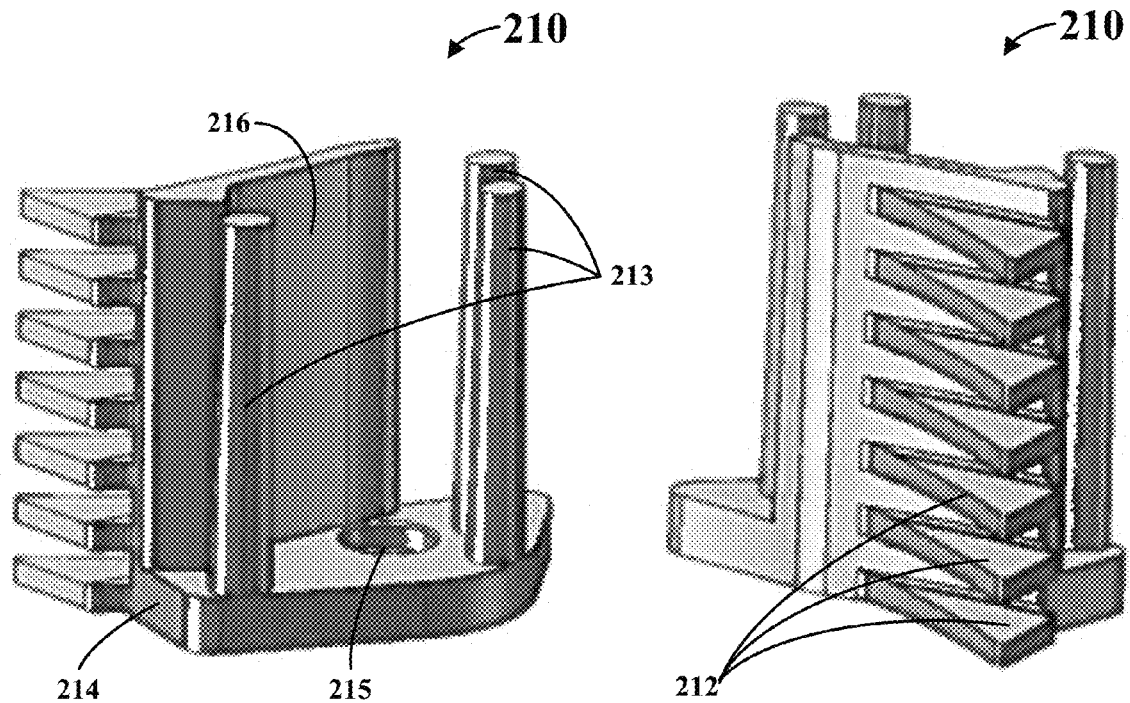
FIG. 2C is a top view of a recirculation filter assembly in a disc drive assembly, consistent with various aspects of the present disclosure.
Figure 2C:
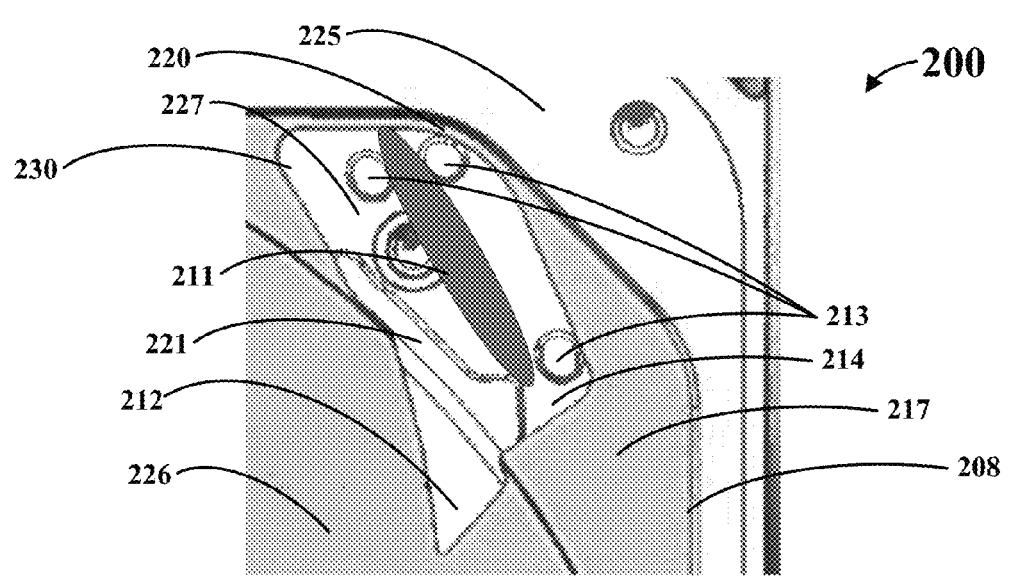

FIG. 2A is an isometric view of a recirculation filter housing 210, consistent with various aspects of the present disclosure. The recirculation filter housing 210 includes a number of posts 213 that extend from a base 214 and support a particulate filter, and can be coupled to a base deck at 215. Wall 216 extends from the base 214. The posts 213, in conjunction with a peripheral wall of a base deck cavity, define a filter channel that draws a portion of the flow of atmosphere from the cavity of the base deck into the particulate filter. A low-pressure area and a high-pressure area are thus respectively provided at an outlet and an inlet of a particular filter coupled to the posts (e.g., filter 211 as noted in FIG. 2C). This pressure differential draws air through the particulate filter into the low-pressure area adjacent the output of the particulate filter. As shown in FIG. 2B, a plurality of shrouds 212 are coupled to, and extend from, the wall 216. The plurality of shrouds 212 act to divert air into the filter channel defined by the posts 213 and the peripheral wall of the base deck cavity, and create a deceleration of atmospheric flow on the leeward-side of the plurality of shrouds 212 forming the low-pressure area. In the filter channel, the flow of atmosphere into an increasingly smaller channel area pressurizes the atmosphere to form the high-pressure area.

FIG. 2C is a top view of a recirculation filter assembly 230 in a disc drive assembly 200 including a base deck 225. The recirculation filter assembly 230 includes a particulate filter 211 that is coupled to base 214 via posts 213 that extend from the base. A filter channel 217 (e.g., a region in the cavity via which gas is flowed toward the filter) is formed by shrouds 212, shroud wall 221, and a peripheral wall 208 of the base deck cavity 226. The filter channel 217 channels gas flowing in the cavity of the disc drive into the particulate filter 211, thereby removing particles from the atmosphere that may cause damage to the electro-mechanical components of the disc drive. In disc drive embodiments utilizing low-density atmosphere within the disc drive cavity 226, large flow rates through the particulate filter 211 are useful as the low-density atmosphere is incapable of keeping larger particulate (e.g., greater than 500 nano-meters) aloft under decreased flow rates. Accordingly, aspects of the present disclosure maintain large flow rates of atmosphere through the particulate filter 211 by drawing large quantities of atmosphere into the filter channel 217 (via shrouds 212). The filter channel 217, due to its decreasing-area, may accelerate the flow of atmosphere leading to the particulate filter 211 and cause a high-pressure atmospheric area within the filter channel. The plurality of shrouds 212, due to the large amount of atmosphere the shrouds divert into the filter channel 217, create a low-pressure area adjacent an output 227 of the particulate filter. The combination of a high-pressure atmospheric area within the filter channel 217, and a low-pressure area at the particulate filter output 227 acts to draw the flow of atmosphere in the filter channel through the particulate filter.

As also shown in FIG. 2C, a bypass channel 220 allows for a portion of the flow of atmosphere through the filter channel 217 to flow through the bypass channel into the output 227 without being filtered by the particulate filter 211. It has been discovered that such a bypass channel 220 increases the flow of atmosphere through the particulate filter 211.

Figure 3A:
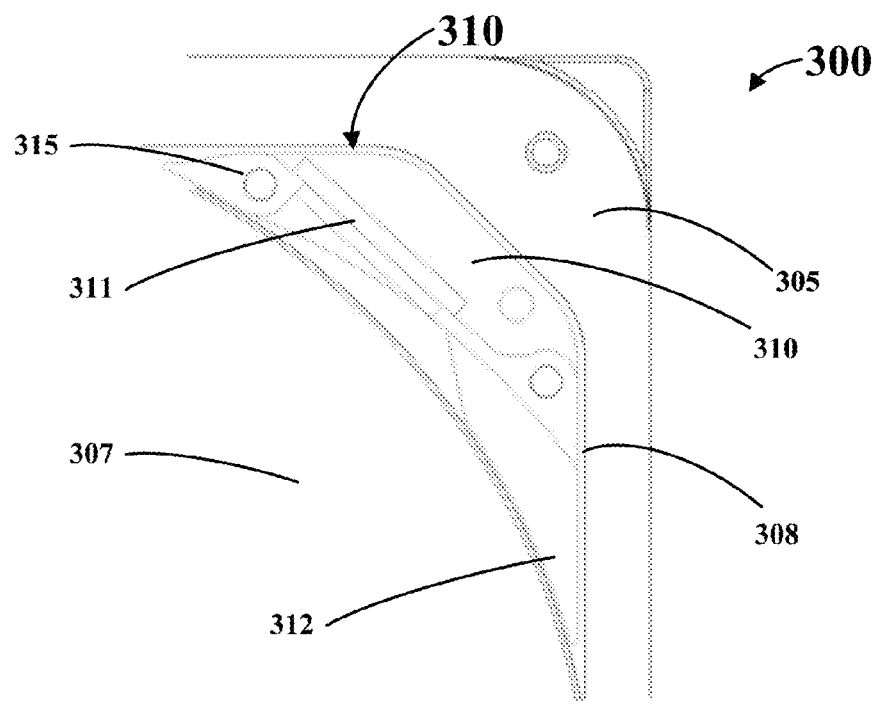
FIG. 3A is a top view of a recirculation filter assembly in a disc drive assembly, consistent with various aspects of the present disclosure.

FIG. 3A is a top view of a recirculation filter assembly 310 in a disc drive assembly 300. The recirculation filter assembly 310 is shown with a plurality of shrouds 312 in a retracted position (with the shrouds pivoted, via pivot point 315, against or adjacent to a peripheral wall 308 of the base deck cavity 307). During assembly, the retracted position of the plurality of shrouds 312 allows for the installation of rotating data storage mediums in the cavity 307. Particulate filter 311 is coupled to a portion of the filter assembly 310, such as via an adhesive, fastener, and/or fusing the particulate filter to the filter frame (e.g., heat bonding). It has been discovered that fusing the particulate filter 311 allows for increased filter size (due to decreased filter area needed for fastening the filter to the frame) and thereby increases the flow of gas through the filter. Once the rotating storage medium has been installed into the cavity 307, the recirculation filter assembly 310 may be pivoted via the pivot point 315 into an extended position and fastened to the cavity of the base deck 305 (as shown in FIG. 3B).

Figure 3B:
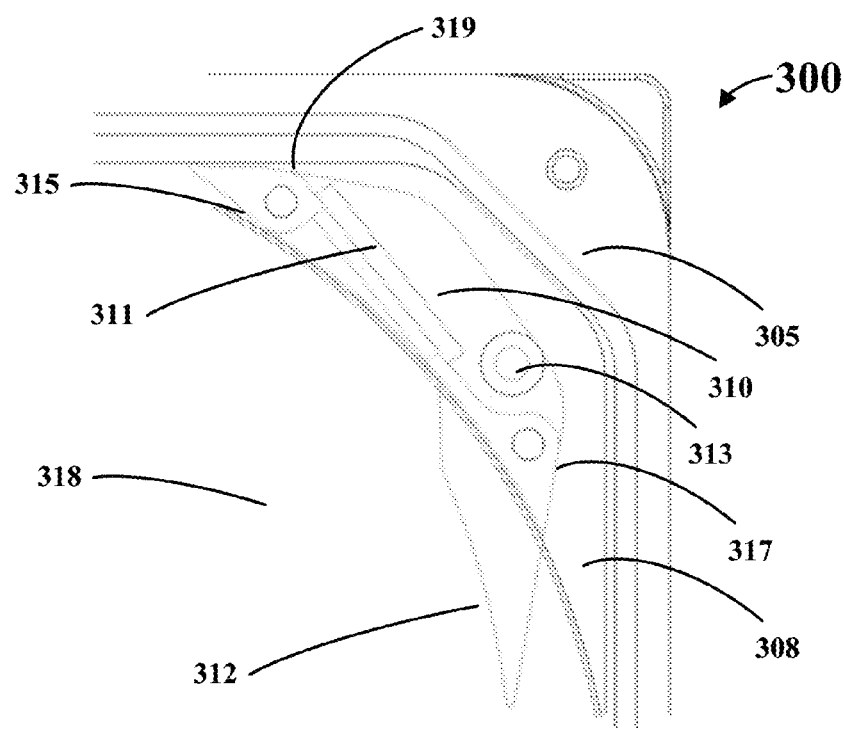
FIG. 3B is a top view of a recirculation filter assembly in a disc drive assembly, consistent with various aspects of the present disclosure.

FIG. 3B shows the recirculation filter assembly 310 pivoted into an extended position. A fastener 313 couples the recirculation filter assembly 310 to the cavity of the base deck 305, locking the recirculation filter assembly into the extended position. It is to be understood that various coupling techniques may be implemented to mount the recirculation filter frame to the base deck, or the recirculation filter frame may itself be a feature of the base deck. In the extended position, the shrouds 312 are interleaved between outer periphery portions of stacked rotating data storage mediums 318. A filter channel 317 extends between the recirculation filter assembly 310 (in the extended position) and a periphery wall 308 of the base deck cavity, and directs atmosphere that is relocated (in-part) by the plurality of shrouds 312 through the particulate filter 311. In particular, the rotating data storage mediums 318 create a flow of gas tangential to an outer surface of the mediums in response to a friction between surfaces of the rotating storage mediums and the atmosphere within the cavity. A bypass channel 319 allows a portion of the gas flowing within the filter channel 317 to bypass the particulate filter 311. The bypass channel 319 and shrouds 312 thus form a high-pressure region at an inlet of the particulate filter 311, and a relatively low-pressure region at an outlet of the particulate filter. This pressure differential acts to flow gas through the particulate filter 311.

Based upon the above discussion and illustrations, those skilled in the art will readily recognize that various modifications and changes may be made to the various embodiments without strictly following the exemplary embodiments and applications illustrated and described herein. For example, the shape and location of the shrouds, filter channel, and bypass channel need not conform to the exemplary embodiments discussed herein; recirculation filter assemblies, as claimed, may cover a wide variety of configurations, assembly techniques, and atmosphere filtering methodologies. Such modifications do not depart from the true spirit and scope of the present disclosure, including that set forth in the following claims.

What is claimed is:

1. An apparatus comprising:
   a base deck having a cavity configured and arranged to house data storage components including a storage medium;
   a filter in the cavity and laterally adjacent a portion of the cavity that is configured and arranged to house the storage medium;
   a protrusion configured and arranged to extend over a surface of the storage medium and to divert gas from the surface of the storage medium toward the filter as the storage medium rotates; and
   a bypass channel defined by a sidewall of the cavity and a portion of the filter, the bypass channel being configured and arranged with the protrusion to create a pressure differential that draws a first portion of the diverted gas through the filter by bypassing the filter with a second portion of the diverted gas, wherein the filter includes: a filter material configured and arranged to filter particulates carried by the diverted gas while passing the first portion of the diverted gas, the filter material having an outlet side facing the portion of the cavity that is configured and arranged to house the storage medium and an inlet side facing a portion of the bypass channel and the sidewall of the cavity that defines the bypass channel; and a filter bracket coupled to the base deck at a portion of the base deck laterally adjacent the storage medium, the filter material being secured to the filter bracket, a portion of the filter bracket defining a sidewall of the bypass channel and positioned relative to the sidewall of the cavity to define a width of the bypass channel.

2. The apparatus of claim 1, wherein the bypass channel is configured and arranged with the protrusion to generate higher pressure at an inlet of the filter relative to lower pressure at an outlet of the filter by diverting the gas from the surface of the storage medium to an inlet of the filter and flowing the second portion through the bypass channel and past the outlet of the filter.

3. The apparatus of claim 1, further including the data storage components in the cavity, the data storage components being configured and arranged to provide access to data stored on the storage medium as the storage medium rotates.

4. The apparatus of claim 3, wherein
the data storage components include a plurality of storage mediums including said storage medium in a stacked arrangement with adjacent ones of the storage mediums having respective surfaces that face each other and a gap therebetween, each gap being substantially free of structure; and
the protrusion includes at least one protrusion configured and arranged to extend into one of the gaps.

5. The apparatus of claim 3, wherein
the data storage components include a plurality of storage mediums that include said storage medium, and
the protrusion extends into a space between peripheral ends of adjacent ones of the storage mediums, and is configured and arranged with the respective storage mediums to divert gas from the space toward the filter, while the respective storages mediums are rotating.

6. The apparatus of claim 3, wherein the data storage components include a plurality of storage mediums that includes said storage medium, in a stacked arrangement with adjacent ones of the storage mediums having respective surfaces that face each other with a gap therebetween, and
the protrusion extends into a space between adjacent ones of the storage mediums, and is configured and arranged to absorb vibration energy exerted on one or more of the plurality of storage mediums by contacting at least one of the plurality of storage mediums.

7. The apparatus of claim 3, wherein the gas is substantially helium and the filter is configured and arranged with the protrusion and storage medium to capture greater than 60% of 100 nm particulate in the cavity as the storage medium rotates to provide access to the data.

8. The apparatus of claim 3, wherein
the gas is substantially helium;
the filter is configured and arranged with the protrusion and storage medium to capture greater than 70% of 500 nm particulate in the cavity as the storage medium rotates to provide access to the data; and
the data storage components include:
a transducer configured and arranged to access data stored on the storage medium as the storage medium rotates, and
a voice coil motor coupled to the base deck and the transducer, the voice coil motor configured and arranged for positioning the transducer relative to the storage medium, the voice coil motor and the transducer being located in the cavity on an opposite side of the storage medium relative to the filter.

9. The apparatus of claim 1, wherein the protrusion is coupled to a shaft mounted to the base deck, the shaft being configured and arranged with the protrusion to rotate the protrusion between a position in which the protrusion is laterally adjacent the storage medium and a position in which the protrusion extends over the surface of the storage medium.

10. The apparatus of claim 1, wherein the base deck includes a bottom portion and sidewalls extending upward from the bottom portion, the sidewalls being shaped to provide a mounting space between the storage medium and an inner surface of the sidewall that faces the storage medium, the filter being coupled to the bottom portion of the base deck in the mounting space.

11. The apparatus of claim 10, wherein the storage medium has a circular shape and substantially all of the inner surface of the sidewall conforms to the circular shape, with the inner surface having a shape that diverts from the circular shape at the mounting space.

12. The apparatus of claim 1, wherein
the apparatus includes a base deck cover that encloses the cavity with the base deck, therein forming an enclosed cavity,
the enclosed cavity includes a low-density gas atmosphere, the low-density gas atmosphere having a density that is less than the density of air at about 0.5 atm at sea level, and
the filter is configured and arranged with the protrusion and the storage medium to provide the pressure differential at a level that is equal to or greater than 15 pascals, under conditions in which the storage medium rotates.

13. The apparatus of claim 1, wherein
the apparatus includes a base deck cover that encloses the cavity with the base deck, therein forming an enclosed cavity,
the enclosed cavity contains a low-density gas atmosphere, the low-density gas atmosphere having a density that is less than air density at about 0.5 atm at sea level, and
the bypass channel is configured and arranged with the protrusion and the storage medium to provide a flow of gas through the filter greater than 30 cubic centimeters/ second.

14. A disc drive apparatus comprising:
a base deck having a cavity;
data storage components including a plurality of storage mediums in a stacked arrangement, the data storage components being in the cavity and configured and arranged to provide access to data stored on the storage mediums as the storage mediums rotate;
a cover hermetically sealed to the cavity;
a low-density atmosphere sealed in the cavity, the low-density atmosphere including a gas, and having a density that is less than air density at about 0.5 atm at sea level; and
a recirculation filter coupled to the base deck, the recirculation filter including
a frame between an inner sidewall of the base deck and the storage mediums, the frame being offset from the inner sidewall and forming a channel between the frame and the inner sidewall,
a plurality of protrusions, each protrusion extending from the frame to a position between adjacent ones of the storage mediums, and
a filter membrane coupled to the frame and configured and arranged with the channel and the protrusions to filter the gas by capturing particulates from the gas as it flows through the filter membrane, and a plurality of transducers, each transducer configured and arranged to access data stored on one of the rotating storage mediums, a voice coil motor rotationally coupled to the base deck and configured and arranged to support each of the transducers above a surface of one of the storage mediums, and wherein the voice coil motor and the recirculation filter are positioned in the cavity on opposite sides of the storage mediums with the recirculation filter having an outlet side facing the plurality of storage mediums and an inlet side facing a portion of the inner sidewall that forms the channel.

15. The disc drive apparatus of claim 14, wherein the frame and the protrusions are configured and arranged to generate a pressure differential across the filter membrane by drawing a portion of the gas around the filter membrane via the channel, therein causing another portion of the gas to flow through the filter.

16. The disc drive apparatus of claim 14, wherein the data storage components are configured and arranged to generate flow of the gas during rotation of the storage mediums, and the protrusions are configured and arranged with the channel to divert the flow of gas through the filter membrane by:
   using the protrusions, diverting a portion of the gas toward the filter,
   creating a pressure differential across the filter membrane by using the channel to pass a first portion of the diverted gas around the filter, and
   via the pressure differential, enhancing an amount of the gas that flows through the filter.

17. The disc drive apparatus of claim 14, wherein the plurality of protrusions are configured and arranged with the channel to provide a flow of the gas through the recirculation filter greater than 30 cubic centimeters/second.

18. The disc drive apparatus of claim 14, wherein the gas is substantially helium, and the filter is configured and arranged with the protrusion and storage medium to capture greater than 70% of 500 nm particulate in the cavity as the storage mediums rotate to provide access to the data.

* * * * *

UNITED STATES PATENT AND TRADEMARK OFFICE
CERTIFICATE OF CORRECTION

PATENT NO. : 9,666,235 B2  
APPLICATION NO. : 14/881942  
DATED : May 30, 2017  
INVENTOR(S) : Jabbari et al.

Page 1 of 1

It is certified that error appears in the above-identified patent and that said Letters Patent is hereby corrected as shown below:

On the Title Page

Item (72) Inventor is corrected to read:
-- Iraj Jabbari, La Jolla (CA);
Robert A. Alt, Niwot (CO);
Jeffrey L. Bruce, Longmont (CO);
Jeffrey James Croxall, Boulder (CO);
David R. Lapp, Boulder (CO);
Jeffrey B. Tattershall, Dacono (CO) --.

Signed and Sealed this
Twenty-second Day of October, 2019

Andrei Iancu
*Director of the United States Patent and Trademark Office*